June 9, 1959     R. S. LOVELAND ET AL     2,889,990

THERMOSTATIC VALVE

Filed March 29, 1957

INVENTOR.
ROGER S. LOVELAND
LEONARD I. WOLFFE

BY

*Alan M. Staubly*

ATTORNEY

2,889,990

THERMOSTATIC VALVE

Roger S. Loveland, Torrance, and Leonard I. Wolffe, Los Angeles, Calif., assignors to Minneapolis-Honeywell Regulator Company, Minneapolis, Minn., a corporation of Delaware Application March 20, 1957, Serial No. 649,488

8 Claims. (Cl. 236—48)

This invention relates to thermostatic valves and, more particularly, to thermostatic gas valves of the type used in controlling the flow of gas to a furnace or space heater.

It has been found to be highly desirable to control the gas flowing to a burner so that a predetermined minimum amount of gas is initially supplied for ignition purposes and the rate of gas flow is thereafter varied according to the demand. One of the objects of this invention is to provide a gas valve which initially opens to a minimum flow position and thereafter modulates according to demand between the minimum flow position and a full on position.

Another object of the invention is to provide a snap-acting and modulating valve subassembly that is adapted to be inserted into a valve body having an inlet and an outlet, with a valve seat therebetween.

Another object of the invention is to provide a snap-acting modulating valve wherein the rate of fuel flow provided by the snap-acting portion of the valve may be adjusted externally of the valve housing.

Still another object of the invention is to provide a mechanical arrangement between a condition responsive means in the valve and a plurality of control valves which transfers the motion of the condition responsive means to these valves with a minimum of power loss between the operating mechanism resulting from friction or binding of the elements of the mechanism.

Figure 1:
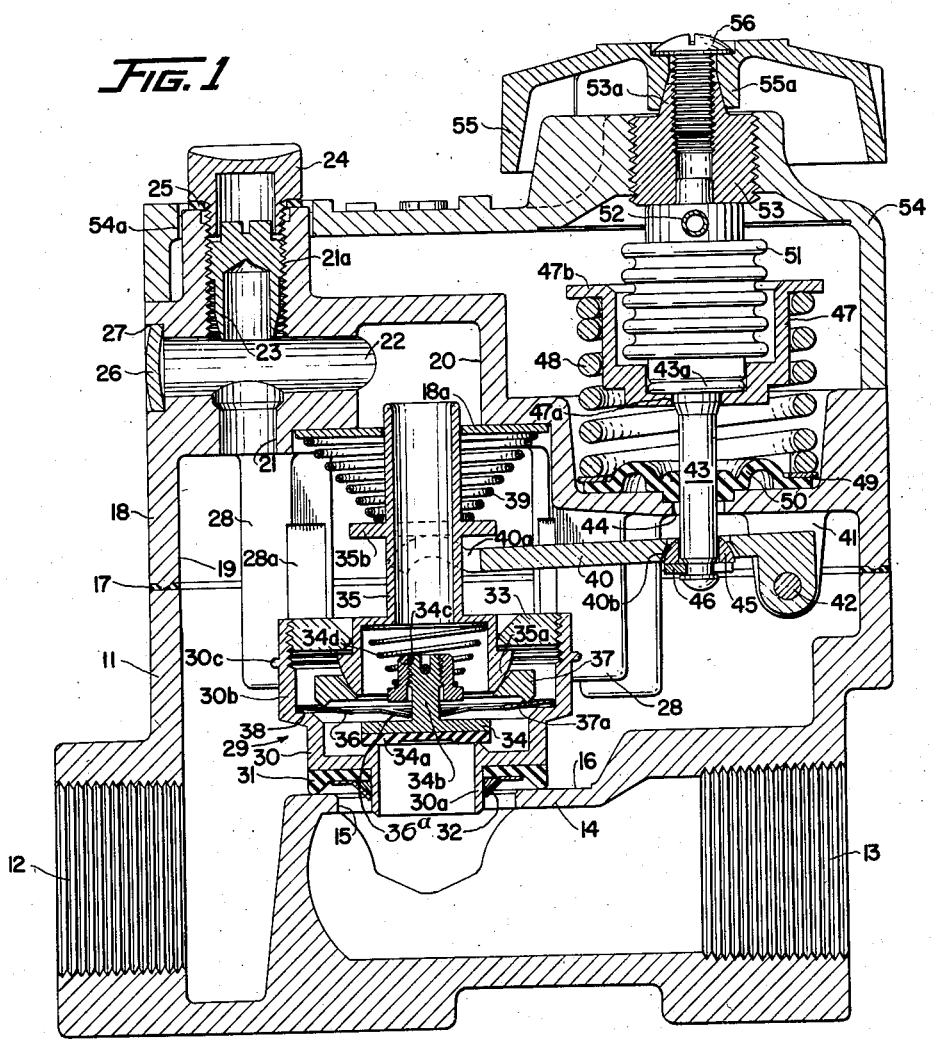
Figure 2:
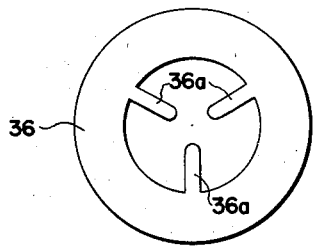

Still further objects of the invention will become apparent upon reading the following detailed description in conjunction with the accompanying drawing wherein:

Figure 1 is a vertical sectional view of the valve taken along the longitudinal axis thereof; and Figure 2 is a plan view of the snap disc for actuating the valve that provides minimum flow.

The invention is illustrated in Figure 1 of the drawing as consisting of a valve body 11 having an inlet 12, an outlet 13, with a partition 14 therebetween. Partition 14 has a bore 15 therethrough and is milled into a valve seat 16 at the inlet side thereof. Secured to the open top of the valve body 11, with a sealing gasket 17 therebetween, is a housing 18 which carries the valve and valve operating mechanism that cooperates with the valve seat 16 to control the flow of fuel through the valve body. The housing 18 is secured to the body 11 by means of bolts (not shown) at spaced points around the housing. The housing has a partition wall therein formed with a large recessed chamber 19 and with a second recessed chamber 20 extending from the recess 19 further up into the housing 18. Crossed bores 21 and 22 establish communication between chamber 19 and the chamber 20 for a purpose to be described hereinafter. The upper end of the bore 21 is screw threaded at 21a and has a flow adjusting valve 23 therein which is adapted to be adjusted to regulate the flow of fuel through the bores 21 and 22. A sealing plug 24 is also threaded into the upper end of the bore 21 with a gasket 25 between it and the top surface of the housing 18, to assure no leakage of gas from the valve body to the atmosphere. The outer end of the bore 22 is sealed by a disc type plug 26 pressed into a recess 27.

The housing 18 also has downwardly extending lugs 28 with milled guide surfaces 28a to serve as a guide means for a valve assembly generally designated by the reference numeral 29.

The valve unit 29 consists of a generally cup-shaped body portion 30 having a sleeve extension 30a at the bottom thereof and an enlarged diameter portion 30b at its upper end. The portion 30b has an annular rib 30c that slidably engages the guide surfaces 28a to guide the valve unit into and out of engagement with the valve seat 16. A sealing washer 31, made of rubber or any suitable material, is secured to the bottom of the unit 29 and around the extension 30a by means of a spring grip washer 32. The upper end of the valve unit body portion 30b has an externally threaded washer 33 screw-threaded therein which serves as a retainer for a second valve 34 positioned coaxially within the body 30. The washer 33 also serves as an abutment shoulder to be engaged by a tubular valve stem 35 for the valve unit 29.

A valve 34, having a conventional sealing disc on its lower surface, is adapted to bear against the upper edge of the sleeve portion 30a which serves as a valve seat. The valve 34 also has an upwardly extending stem 34b that is threaded at its upper end and carries an adjustable nut 34c. The valve is adapted to be actuated by a snap disc 36 (Figure 2) which has a plurality of fingers 36a thereon that engages the lower end of the nut 34c to lift the valve off the seat of the member 30a. The disc is of the type which normally stays in or returns to a position to hold the valve off of its seat but is capable of being snapped to a lower position to free the valve to move to its closed position.

The means for snapping the disc between its open and closed positions consists of a washer-shaped pivot member 37 having an annular knife-edge pivot rib 37a thereon that engages the snap disc 36 substantially intermediate its inner and outer diameters. The outer edge of the snap disc bears on a ring 38 resting on the bottom of the enlarged diameter portion 30b of the valve body 30. It is thus seen that as the fulcrum member 37 moves upwardly and downwardly, a snap disc is pivoted about the ring 38 to cause the fingers 36a of the snap disc to engage the nut 34c to raise the valve off of its seat or to move away from the nut to cause the valve to move to its closed position.

The inner edge of the washer-shaped fulcrum member 37 is coned so as to be engaged by a rounded head portion 35a of the valve stem 35. The head portion 35a provides an annular abutment shoulder at its upper edge that is adapted to engage the under edge of the washer 33 after the stem 35 has moved up sufficiently to cause the snap disc to snap the small valve 34 to its open position. Further movement of the stem 35 upwardly results in the lifting of the whole valve unit 29 off of the seat 16, to provide for full flow of fuel through the valve body.

The valve stem 35 extends freely through the center opening in the member 33 and also extends freely through the center opening of a washer like partition 18a which substantially seals the chamber 20 from the chamber 19 except through the bores 21 and 22. The plate 18a is retained in sealing engagement with the upper wall of the chamber 19 by means of a spiral compression spring 39 that extends between the member 18a and an annular abutment rib 35b on the stem 35. The spring 39 is sufficiently strong to force the stem 35 downwardly against the bias of the snap disc 36 so as to hold valve unit 29 against the valve seat 16 and the valve 34 against its seat.

From the structure thus far described, it is readily seen that as the valve stem 35 moves upwardly against the bias of spring 39, the valve unit 29 will be retained against the seat 16 by the snap disc 36 until the stem 35 has moved sufficiently far as to raise the valve 34 off of its seat and to bring the head 35a into engagement with the washer 33. With only the valve 34 open, gas will flow into the inlet 12 through chamber 19, through bore 21, past valve 23, through bore 22, through chamber 20, through the hollow stem 35, through snap disc 36, past valve 34 and through 30a of the valve unit to the outlet 13. While there will be very small direct flow of gas from the inlet 12 to the outlet 13 between the washer 33 and the valve stem 35 and head 35a and between the washer 18a and the valve stem 35, when the valve 34 is open, the amount of gas flow can be adjusted to provide the desired additional amount by regulating the position of the valve 23.

The means for actuating the valve unit 29 consists of a lever 40 pivotally mounted on a pin 42 extending between two lugs 41 projecting downwardly from the top of recess 19. The free end of the lever 40 has a pair of upwardly arced fingers 40a that straddle the stem 35 and bear against the under surface of the annular rib 35b. A tapered aperture 40b, spaced a short distance from the pin 42, has a lever actuating pin 43 extending therethrough and also through an aperture 44 in the upper wall of the housing 18. The stem 43 carries, at its lower end, a rounded washer-like member 45 that is adapted to engage the bevelled surfaces of the opening 40b, to lift the lever 40 as the stem 43 moves upwardly. The abutment washer 45 is retained on the stem 43 by means of a split ring 46 positioned in an annular groove in the lower end of the stem 43. The upper end of the stem 43 has a head portion 43a. This upper end of the stem 43 extends through an opening 47a of a cup-shaped spring abutment member 47, with the head 43a resting on the bottom of the cup-shaped member. A coiled compression spring 48 extends between a washer 49 and an outwardly extending flange 47b at the upper end of the member 47. The washer 49 clamps to the upper surface of the housing the peripheral edge of a flexible sealing washer 50. This washer fits snugly around the stem 43 to prevent gas leakage from the chamber 19 through the opening 44 to the atmosphere. The spring 48 is of such strength that unless the member 47 is forced downwardly by some power means, the spring will hold the lever 40 upwardly against the bias of spring 39 to cause the valves 34 and 31 to be lifted off of their respective seats.

While various types of power means may be used to actuate the stem 43 and the member 47 downwardly to permit the valves to close, the illustrated means consists of a temperature responsive unit consisting of an expandable bellows 51 connected to a bulb (not shown) through a capillary tube 52. The lower end of the bellows 51 bears against the head 43a of the stem 43 while the upper end of the bellows bears against the inner end of a threaded adjustment stem 53, which is threaded into the upper wall of a cover 54. The cover 54 has an opening 54a therein through which the plug 24 on the housing 18 extends. The cover 54 is secured to the housing 18 by means of bolts (not shown). A handle 55 is secured to the adjustment stem 53 by forcing a conical-shaped socket portion 55a thereof onto a conically shaped extension 53a at the upper end of the stem, by means of a bolt 56.

Operation

The valve is shown with the parts thereof in the positions they assume when the temperature in the space surrounding the bulb connected to the bellows 51 is such as to expand the fluid in the bulb to lower the stem 43 against the bias of spring 48.

Upon a drop in temperature around the bulb, the fluid therein and in the bellows 51 will reduce in volume permitting the spring 48 to move the member 47 and the stem 43 upwardly. As the stem moves up, abutment ring 45 engages the lever 40 and pivots it around the pivot 42 to lift the stem 35. As the stem 35 moves upwardly, the movable fulcrum member 37 will follow its movement under the bias of snap disc 36 and after the snap disc moves sufficiently far, as to cause it to snap over center against the bias of spring 39, to snap the valve 34 open. Further upward movement of the stem 35, will engage the abutment ring 33 and lift the main valve 31 off of seat 16. As mentioned above, when the valve 34 first snaps open, a minimum flow of gas is assured for ignition purposes to prevent flashback and then, only if there is need for additional fuel, does the bellows further contract to cause the main valve to open.

On the temperature rising around the bulb to a point at or above the control temperature, the bellows will expand, causing the head 45 to move away from the lever 40 and the spring 39 to force the lever 40 to follow such movement. As the stem 35 moves downwardly under the bias of spring 39, the valve 31 will first seat on the valve seat 16 and, due to the swivel connection between the head 35a and the annular fulcrum member 37, any slight tilting of the head 30 that may have occurred in its movement may be corrected by a relative rotary movement between the head 35a and the fulcrum member 37. Only after the valve 31 is seated, will further downward movement of the stem 35 cause the snap disc to move over center and free the valve 34 to move with a snap action against its valve seat under the bias of spring 34d. It is to be noted that there is some lost motion between the ends of the fingers 36a of the snap disc and the valve 34 and the nut 34c so as to assure a resilient seating force of the valve 34 against its seat by the spring 34d. A resilient seating force is also applied to the valve 31 through the snap disc 36 acting downwardly on the pivot ring 37. It is thus seen that each of the valves forming a part of the valve unit 29 are assured of tight seating on their respective valve seats due to the spring arrangement and the swivel connection between the actuating stem for the unit 29 and the respective valves. This provides for adequate manufacturing tolerances in the various parts of the assembly and thus makes the device of relatively low manufacturing cost considering the functions performed thereby.

While we have disclosed the preferred embodiment of the invention, it is to be recognized that various modifications may be made therein without departing from the spirit of the invention. The scope of the invention should, therefore, be determined from the appended claims.

We claim:

1. A valve subassembly, for insertion into a valve body having an inlet and an outlet with a valve seat therebetween, comprising a housing having a stepped recess in a partition wall thereof with a washer dividing said recess into a large chamber and a small chamber, a passage in said housing leading from said large chamber to said small chamber, a first valve in said passage, guide lugs extending downwardly from said partition wall and positioned around said washer and below said small chamber, a double valve unit positioned between said lugs for sliding movement along said lugs, said unit having an axially apertured second valve, a disc third valve positioned over the aperture in said second valve, a tubular member extending through said washer and into said valve unit, resilient means between said washer and an abutment on said tubular member, condition responsive means on said housing and operably connected to said tubular member, and means so arranged between said tubular member and said second and third valves as to sequentially actuate said second and third valves to their open positions.

2. A valve subassembly, for insertion into a valve body having an inlet and an outlet with a valve seat therebetween, comprising a housing having a stepped recess in a partition wall thereof with a washer dividing said recess into a large chamber and a small chamber, a passage in said housing leading from said large chamber to said small chamber, a first valve in said passage, a valve unit positioned below said partition, said unit having an axially apertured second valve, a disc third valve positioned over the aperture in said second valve, a tubular member extending through said washer and into said valve unit, condition responsive means on said housing and operably connected to said tubular member, and means so arranged between said tubular member and said second and third valves as to sequentially actuate said second and third valves to their open positions.

3. In a valve subassembly for insertion into a valve body having an inlet and an outlet with a valve seat therebetween, the combination comprising a housing having a stepped recess in a partition wall thereof with a washer dividing said recess into a large chamber and a small chamber, a passage in said housing leading from said large chamber to said small chamber, a first valve in said passage, guide lugs extending downwardly from a wall of said large chamber at points around said washer, a double valve unit positioned between said lugs for sliding movement along said lugs, said unit having an axially apertured second valve, a snap-acting third valve positioned over the aperture in said second valve, a tubular member extending through said washer and into said valve unit, condition responsive means on said housing and operably connected to said member, and means so arranged between said member and said second and third valves as to sequentially actuate said third and second valves to their open positions in that order.

4. A valve subassembly, for insertion into a valve body having an inlet and an outlet with a valve seat therebetween, comprising a housing having a stepped recess in a partition wall thereof with a washer dividing said recess into a large chamber and a small chamber, a passage in said housing leading from said large chamber to said small chamber, a first valve in said passage, guide lugs extending downwardly from a wall of said large chamber, a double valve unit positioned between said lugs for sliding movement along said lugs, said unit having an axially apertured second valve, a disc third valve positioned over the aperture in said second valve, a tubular member extending through said washer and into said valve unit, condition responsive means on said housing and operably connected to said member, and means having a lost motion and swivelled joint so arranged between said member and said second and third valves as to sequentially actuate said second and third valves to their open positions.

5. A valve comprising a valve body having an inlet and an outlet with a valve seat therebetween, a cup-shaped valve having an axial bore therethrough positioned over said valve seat, the upper end of said valve being closed by a washer secured therein, a hollow valve stem extending through said washer and having an inverted cup-shaped head at its lower end, said head having a rounded outer surface, a disc valve positioned over the bore in the first mentioned valve, snap-action means for actuating the second mentioned valve, and an annular pivot member engaging said snap-action means and having a rounded inner surface engaging the rounded surface on said stem head.

6. A valve comprising a valve body having an inlet and an outlet with a valve seat therebetween, a cup-shaped valve having an axial bore therethrough positioned over said valve seat, the upper end of said valve being closed by a wall except for an axial bore therethrough, a hollow valve stem extending through said wall and having an inverted cup-shaped head at its lower end, said head having a rounded outer surface, a disc valve positioned over the bore in the first mentioned valve, snap-action means for actuating the second mentioned valve, and an annular pivot member engaging said snap-action means and having a rounded inner surface engaging the rounded surface on said stem head, said stem head having a lost-motion connection with said valve to provide sequential operation of said valves.

7. A valve comprising a valve body having an inlet and an outlet with a valve seat therebetween, a cup-shaped valve having an axial bore therethrough positioned over said valve seat, the upper end of said valve being closed by a washer secured therein, a hollow valve stem extending through said washer and having an inverted cup-shaped head at its lower end, said head having a rounded outer surface and lost-motion movement with respect to said washer, a disc valve positioned over the bore in the first mentioned valve, snap-action means for actuating the second mentioned valve, and an annular pivot member engaging said snap-action means and having a rounded inner surface engaging the rounded surface on said stem head.

8. A valve comprising a valve body having an inlet and an outlet with a valve seat therebetween, a cup-shaped valve having an axial bore therethrough positioned over said valve seat, the upper end of said valve being closed by a washer secured therein, a hollow valve stem extending through said washer and having an inverted cup-shaped head at its lower end, said head having a rounded outer surface, a disc valve positioned over the bore in the first mentioned valve, snap-action means for actuating the second mentioned valve, an annular pivot member engaging said snap-action means and having a rounded inner surface engaging the rounded surface on said stem head, and a by-pass passage around said first valve into which said hollow stem extends.

References Cited in the file of this patent
UNITED STATES PATENTS

| 2,702,052 | Grayson | Feb. 15, 1955 |
| 2,783,946 | Lansky | Mar. 5, 1957 |